L. F. NIELSEN.
INK DISTRIBUTING ROLLER.
APPLICATION FILED JAN. 18, 1915.
1,167,652.
Patented Jan. 11, 1916.
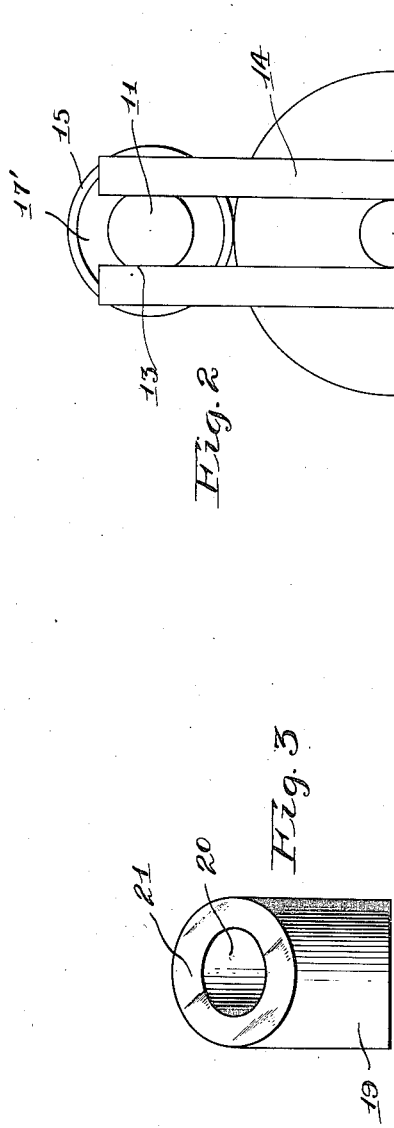
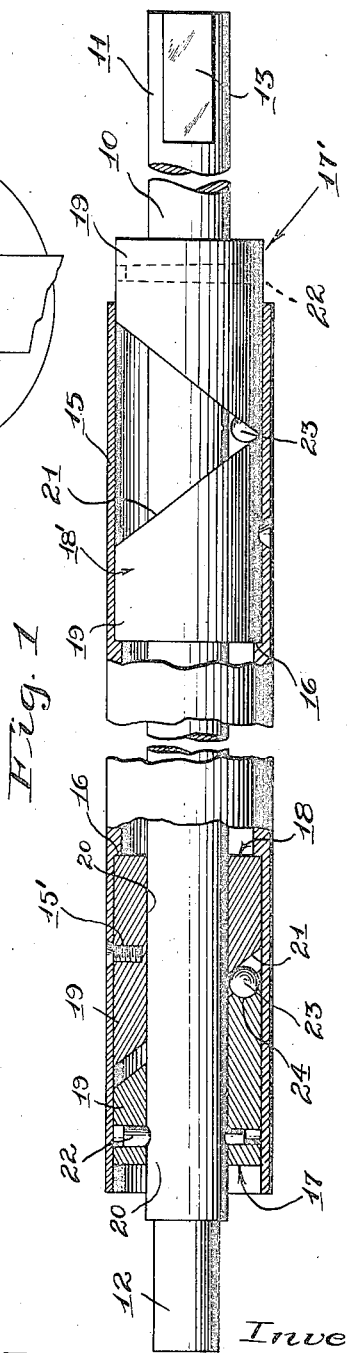
Witnesses
F. C. Caswell
A. M. Ruge.
Inventor
Lauritz F. Nielsen
by John E. Stryker atty.

UNITED STATES PATENT OFFICE.

LAURITZ F. NIELSEN, OF ST. PAUL, MINNESOTA, ASSIGNOR TO OSTERLIND PRINTING PRESS AND MANUFACTURING COMPANY, OF ST. PAUL, MINNESOTA, A CORPORATION OF MINNESOTA.

INK-DISTRIBUTING ROLLER.

1,167,652.  Specification of Letters Patent.  Patented Jan. 11, 1916.

Application filed January 18, 1915. Serial No. 2,856.

*To all whom it may concern:*

Be it known that I, LAURITZ F. NIELSEN, a citizen of the United States, residing at St. Paul, in the county of Ramsey and State of Minnesota, have invented new and useful Improvements in Ink-Distributing Rollers, of which the following is a specification.

My invention relates to improvements in vibrating distributing rollers for printing presses. Its object is to provide a simple and durable roller of this class, adapted to be turned by frictional contact with an adjacent moving surface and having improved mechanism contained therein for reciprocating said roller longitudinally as it rotates.

In the drawings Figure 1 is a fragmentary view illustrating part of my improved roller in elevation and part in section; Fig. 2 shows one end thereof, together with a conventional composition roller and illustrates one of the uses to which my roller may be applied, and Fig. 3 is an elevation in detail of one of the roller shifting cams.

Referring to the accompanying drawings, I have used the reference numeral 10 to indicate a roller shaft, having supports 11 and 12 at opposite ends thereof. The support 11 is formed with opposed flat surfaces 13, which fit the ordinary forked roller mounting 14 (shown in Fig. 2) and secure said shaft against rotation therein. The shell 15 is a tube, the bore at the ends thereof being larger than the bore at the center to form annular shoulders or cam seats 16 within said shell. I employ two thrust bearings 17, 17' and two cams, 18, 18'. Said cams and bearings are similar in general structure and a description of one will apply to all. Each consists of a cylinder 19 having a central bore 20 to receive the shaft 10. One end surface of each of these cylinders is cut obliquely with respect to the axis (as shown in Fig. 3). The cylinders forming the cams 18 and 18' are secured by the screws 15' in position abutting against the shoulders 16 within the shell 15 and form revoluble and slidable supports for said shell upon the shaft. The oblique cam surfaces 21 face opposite ends of the shell 15 and said cams are fixed upon the shaft 10 with these oblique surfaces diametrically reversed. The bearings 17 and 17' are secured to the shaft 10 by pins 22, the peripheries of said bearings forming revoluble and slidable journals for the ends of said shell. The oblique surfaces on both these bearings 17 and 17' face inward and (as shown) upward. To reduce friction between the cam faces 21 and bearings 17 and 17', I supply a ball 23 within a socket 24 on the face of each of the bearings 17 and 17', so placed as to be in contact with the adjacent cam face 21. Said bearings 17 and 17' are arranged on the shaft in such manner that the low point on the face 21 of the cam 18 bears against the ball 23 in the bearing 17 and the high point on the face 21 of the cam 18' bears against the ball 23 in the bearing 17'. As the shell 15 is turned it is shifted to the right (as seen in Fig. 1) by the cam 18 and to the left by the cam 18'.

In use, the supports 11 and 12 are placed in suitable mountings and are arranged so that the periphery of the shell 15 rests upon a moving surface, such as the composition roller 25, illustrated in Fig. 2. Said shell 15 is turned by frictional engagement with said moving surface and is reciprocated upon its shaft 10 by the cams 18 and 18'. The resulting rotary and reciprocating movement of the shell efficiently distributes ink upon the surface with which it is in contact.

Having described my invention, what I claim as new and desire to protect by Letters Patent is:

1. In a device of the class described, the combination of a shaft, spaced bearings secured to said shaft, cams revoluble and slidable on the shaft, a tubular shell secured to and carried by said cams and also having a revoluble and slidable mounting near its ends upon said bearings, said cams being adapted to impinge against the stationary bearings and reciprocate said shell as the same is turned.

2. In a device of the class described, the combination of a shaft, a tubular shell revoluble and slidable on the shaft, cams within the shell and a fixed ball bearing for each cam face, said cams being arranged to engage said bearings and reciprocate said shell as the same is turned.

3. In a device of the class described, the combination of a shaft fixed against rotation and longitudinal movements, bearings secured to said shaft, a shell revoluble and slidable on the shaft and cams on the shell adapted to impinge against said stationary bearings and alternately shift said shell longitudinally as the same is rotated.

4. In a device of the class described, the combination of a rigid shaft, bearings secured to said shaft, a tubular shell revoluble and slidable at its ends on said bearings, and cams secured upon the inner periphery of said shell, said cams being adapted to impinge against said bearings and impart a lengthwise reciprocating movement to the shell.

In testimony whereof, I have signed my name to this specification in the presence of two subscribing witnesses.

LAURITZ F. NIELSEN.

Witnesses:
F. C. CASWELL,
A. M. RUGE.